United States Patent [19]

Hajek et al.

[11] 3,742,033

[45] June 26, 1973

[54] PROCESS FOR THE PREPARATION OF MONO-AND POLYIMINES WITH ELECTROPHILIC DOUBLE-BOND SYSTEMS

[75] Inventors: Manfred Hajek; Kuno Wagner, both of Leverkusen, Germany

[73] Assignee: Bayer Aktiengesellschaft, Leverkusen, Germany

[22] Filed: Nov. 20, 1969

[21] Appl. No.: 878,558

[30] Foreign Application Priority Data
Nov. 29, 1969  Germany.................. P 18 11 657.9

[52] U.S. Cl. .... 260/471 R, 260/2.5 AJ, 260/465 D, 260/465.4, 260/468 J, 260/470, 260/481 R, 260/482 R, 260/482 P, 260/514 J, 260/518 R, 260/519, 260/534 R, 260/534 E, 260/558 A, 260/566 R
[51] Int. Cl........................................... C07c 101/44
[58] Field of Search.................. 260/471 A, 471 R, 260/482 P, 482 R, 468 J, 514 J, 518 R

[56] References Cited
OTHER PUBLICATIONS
Finar, I. L. Organic Chemistry, Vol. I, (1963) Pub. by Richard Clay & Co. Ltd. of Great Britain, pg. 76.

*Primary Examiner*—Lorraine A. Weinberger
*Assistant Examiner*—L. Arnold Thaxton
*Attorney*—Burgess, Dinklage and Sprung

[57] ABSTRACT

Imines substituted in the $\alpha$-position are obtained by reacting mono- or polyimines (ket- and aldimines) with an electrophilic olefin (i.e., acrylic and metacrylic acid derivatives) at a temperature between 10° and 150° C, optionally under pressure and optionally in the presence of an inert solvent.

The imines modified by the process of the invention have many possible uses and represent valuable intermediates for many organic syntheses.

The new compounds obtainable according to the process can be used in the preparation of elastic moulding masses.

14 Claims, No Drawings

PROCESS FOR THE PREPARATION OF MONO-AND POLYIMINES WITH ELECTROPHILIC DOUBLE-BOND SYSTEMS

From German Pat. No. 951,568 and U.S. Pat. No. 2,768,962 it is known that aldimines and ketimines having hydrogen on the o-carbon atom of the carbonyl moiety can be cyanoethylated with acrylonitrile.

It has now, surprisingly, been found that not only the very reactive acrylonitrile, but also the markedly less reactive acrylic and methacrylic derivatives, such as esters and amides, will undergo this reaction. They do so under astonishingly mild conditions. This was not to be expected from the teachings of the above patents, since these describe the reaction as occurring at high temperature and, normally, under pressure. It has further been found that this reaction can be carried out on a large range of electrophilic double-bonded systems, such as maleic anhydride derivatives.

Normal Michael additions, such as the addition of acrylonitrile to cyclohexanone, must be basically catalysed. On the other hand, acrylic acid methyl ester can, under surprisingly mild conditions, add to an imine of cylohexanone in the complete absence of a catalyst.

A further wholly characteristic difference exists in the end products if several equivalent active hydrogen atoms are present in a compound. Cyclohexanone reacts also with a less-than-stoichiometric amount of acrylonitrile to give primarily 2,2,2',2'-tetracyanoethyl-cyclohexanone. On the other hand, an imine of cyclohexanone reacts with one mole of acrylic acidester to give primarily a monoaddition product, and with two moles of acrylic acid ester to give a 2.2'-bis-addition product. The two remaining hydrogen atoms in the 2- and 2'-positions are not utilized under normal reaction conditions.

The object of the invention is a process for the preparation of imines substituted in the α-position, which is characterized in that mono- or polyimines of the formula

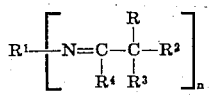

in which $R^1$ stands for a hydrocarbon radical optionally containing heteroatoms and optionally substituted;

$R^4$ stands for a hydrogen, alkyl, cycloalkyl, aralkyl, or aryl radical, or, together with $R^3$, forms a 5 – 12 membered isocyclic or heterocyclic ring;

R, $R^2$, and $R^3$ independently of each other, stand for hydrogen, alkyl, cycloalkyl, aralkyl or aryl radicals, with the limitation that one of these radicals must be hydrogen; and $n$ stands for a whole number from 1 to 6, are reacted with an electrophilic olefin of the formula

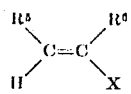

in which $R^5$ and $R^6$ independently of each other stand for hydrogen, alkyl, alkenyl, alkoxy, aralkyl, cycloalkyl, aryl, styryl, carboxy, carbalkoxy, carbamido or cyano radicals;

$R^5$ and $R^6$ together can form a 5–8 membered isocyclic or heterocyclic ring; and X stands for H, —COOH, —COO-alkyl, —CONH₂, —CO-alkyl, —COaryl, —SO₂-alkyl, —SO₂-aryl and —SO₂—CH=CH₂;

at a temperature between 10° and 150° C, optionally under pressure and optionally in an inert solvent.

$R^1$ is preferably an n-valent alkyl radical with two to 10 carbon atoms, an n-valent radical derived from benzene, or an optionally substituted cycloalkyl radical with a total of five to 12 carbon atoms, and five to seven carbon atoms in the ring.

R and $R^2$ to $R^4$ are preferably H, alkyl $C_1$-$C_{10}$, cycloalkyl $C_5$-$C_7$, phenyl-, benzyl- or naphthyl radicals.

Substituents for $R^1$, are, for example, OH, halogen, alkoxy and aryloxy. Such alkoxy substitutents have preferably one to 10 carbon atoms, and the aryl substituents are preferably benzyl, phenyl, and naphthyl.

The compounds obtained have the general formula:

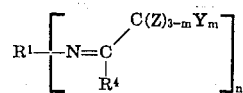

In this formula $R^1$, $R^4$ and $n$ have the meanings given above, Z stands for as many of the radicals $R^1$, $R^2$ and $R^3$ as are retained, Y for the radical

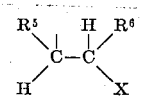

derived from the electrophilic olefin, and $m$ for 1, 2 or 3

The ket- and aldimines for the process according to the invention are obtained according to methods known from the literature by the condensation of aliphatic, cycloaliphatic, araliphatic and aromatic primary mono- or polyamines with carbonyl compounds.

The following aldehydes are, for example, suitable as carbonyl components: acetaldehyde, propionaldehyde, n-butryal-dehyde, isobutyraldehyde, n-valeraldehyde, iso-valeraldehyde, capronaldehyde, heptanal, 3-formylheptane, formylcyclohexane, 1- and 2-methyl-4-formyl cyclohexene-(1), phenylacetaldehyde, and 3-phenyl propionaldehyde.

As suitable ketones the following are, for example, mentioned: acetone, methyl ethyl ketone, methyl-n-propylketone, diethyl ketone, methyl-n-amylketone, di-iso-butylketone, methyl-t-butyl ketone, methyl n-heptylketone, acetylacetone, acetonyl-acetone, acetophenone, propiophenone, cyclopentanone, cyclohexanone, 1-methyl-cyclohexanone-(2), 1-cyclohexyl cyclohexanone-(2) cyclohexadione-(14), acetyl cyclohexanone, cyclododecanone, hydrindone and tetralone. As suitable monoamines the following are, for example, mentioned: methylamine, ethylamine, propylamine, isopropylamine, butyl-amine, isobutylamine, t-butylamine, amylamine, allylamine, isoamylamine, dodecylamine, tetradecylamine, 3-methoxypropylamine, 3-ethoxy-propylamine, 3-butyloxy propylamine, myristylamine, hexadecylamine, stearylamine, cyclohexylamine, benzylamine, aniline, o-, m- and p-toluidine, o-, m- and p-chloroaniline, o- m- and p-nitroaniline, and p-anisidine. As suitable polyamines the following are, for example, named: ethylene diamine, propylene diamine, 1,4-diaminobutane, hexamethylene diamine, trimethyl hexamethylene diamine, diaminomethyl-cyclobutane, diethylene triamine, triethylene tetramine, tetraethylene pentamine, pentaethylene hexamine, 1,2-diaminopropane, dipropylene triamine, tripropylene tetramine, 3-amino-1-methylaminopropane, 3-amino dimethylamino propane, 3,3'-diamino dipropylamine, methyl-bis-(3-aminopropyl)-amine, α,ω-diaminocaproic acid methyl ester, hydrogenated thiodipropionic acid nitrile, 3,3'-diaminodipropyl ethers, as prepared from oligomeric polymerization or polyaddition products of propylene oxide (ethylene oxide) by reaction with ammonia under pressure in the presence of Ni-catalysts, 1,4-diamino-cyclo-hexane, 4,4'-diamino-dicyclohexyl methane, 4,4-diamino-dicyclohexylether and 4,4'-diamino-dicyclohexylthioether, m- and p-xylylenediamine, isophorone diamine, 2,4-diaminotoluene, 2,6-diaminotoluene 4-amino-2-acetylamino toluene, dimethyl-(4-aminobenzyl)-amine, 1,3-bis-aminomethyl-4,6-dimethyl benzene, 2,4-diamino-3,5-diethyl toluene, 2,4-diamino-1,3,5-triisopropylbenzene, 4,4'-diaminodiphenyl methane, 4,4'-diaminodiphenyl ether, 4,4'-diaminodiphenyl thioether, oligomeric polyamines that can be prepared by acid condensation of aniline and formaldehyde, m-phenylene diamine, 1,4- and 1,5-napthylene diamine, 4,4'-diamino-3,3'-dichloro-diphenyl methane, 4,4'-diamino-3,3'-dichloro-diphenyl ether, 4,4'-diaminodiphenyl-dimethyl methane, 1,1-bis-(4-amino-phenyl)-cyclohexane, 4,4',4''-triamino-triphenyl methane, urethane- and urea-group containing polyamines, as prepared by reaction of p-nitro-phenyl isocyanate with low molecular polyols such as ethyleneglycol, 1,4-butanediol, hexanediol or diamines such as hexamethylenediamine, followed by hydrogenation.

The following are selected as examples from among the useful amino-alcohols and their derivatives: 2-amino ethanol, 3-amino propanol, 4-amino butanol-(2), further the hydrogenation products of the addition products of acrylonitrile and mono- and poly-hydroxy alcohols such as methanol, ethanol, butanol, ethyleneglycol, butane diol, hexane diol, bis-hydroxyalkylated diols, neopentyl glycol etc., diethylene glycol, triethylene glycol, hydroquinone, 4,4'-dihydroxy-diphenyl-dimethylmethane etc., and also general hydrogenation products of cyanoethylated mono- and polyamines.

Polyamines containing polynuclear aromatic polyether residues that may be used with particular advantage are, for example, those that may be obtained by the acid-catalysed condensation of aniline with formaldehyde. Other useful polyamines containing polynuclear aromatic polyether residues obtainable for example from bis-epoxides (such as those obtainable from bisphenol A and epichlorohydrin) by reaction with a large excess of diamine or polyamine (such as ethylene diamine, tetramethylene diamine, hexamethylene diamine, m- and p-xylylene-diamine, and isophorone diamine); the polyether polyamines thus produced contain primary amino groups and additional hydroxyl and secondary amino groups formed by addition to the oxirane ring.

The following electrophilic double-bonded systems are particularly suitable for the process of the invention: Acrylic acid, acrylic acid methyl ester, acrylic acid ethyl ester, acrylic acid propyl ester, acrylic acid butyl ester, methacrylic acid, methacrylic acid methyl ester, methacrylic acid ethyl ester, methacrylic acid propyl ester, methacrylic acid butyl ester, acrylic acid-β-hydroxy-ethyl ester, methacrylic acid β-hydroxyethyl ester, acrylic acid β-hydroxy-propyl ester, methacrylic ester, methacrylic acid -hydroxy-propyl ester, acrylamide, methacrylamide, methacrylamide-N-methylol-methlyl ester, N,N-dimethyl acrylamide, vinylchloride, methylvinylsulphone, phenylvinylsulphone, divinylsulphone, maleicacid, fumaricacid, half- and di-esters of maleic and fumaric acids, which are derived from methanol, ethanol, propanol, isopropanol, butanol, isobutanol, pentanol, ethyleneglycol, diethylene glycol, triethylene glycol, 2,2-dimethylpropanediol-(1,3), glycerine, trimethylol propane, thiodiglycol, etc. maleic acid polyesters, maleic anhydride, acrolein, crotonaldehyde, β-hydroxycrotonaldehyde, β-hydroxycinnamaldehyde, vinylmethylketone, vinylphenylketone, divinylketone, mesityloxide, benzylideneacetone, and styrene.

In the preferred embodiment of the process of the invention the compound having a electrophilic double-bonded system is slowly added at between 10° and 120° C., preferably between 20° and 80° C., to the imine. Many reactions proceed exothermically and attention must be paid to cooling.

In most cases stoichiometric quantites of the reactants are sufficient. An excess of olefin is only to be used with particularly high degrees of addition.

In most cases a stabilizer for the ethylenic components may be dispensed with; the addition usually proceeds faster than a possible polymerization or graft polymerization.

In a variation of the process the imine may initially be in the form of a solution. This variation is particularly useful in the preparation of high addition products which otherwise can be viscous or solid.

The following solvents are, for example, suitable: methylene chloride, chloroform, butyl acetate, dibutyl ether, cyclohexane, benzene, toluene and xylene. The reaction can nevertheless take place also in linear or branced polyols such as ester-, ether-, thioether-, or acetal-group-containing polyols, for example linear or branched propylene glycol polyether. For particular applications the solvent can be optionally removed.

A further variation of the process of the invention consists in carrying out the reaction under increased pressure. This variant is particularly useful when easily volatilized components are used.

In most cases a catalyst can be dispensed with. Optionally, improvements may be obtained by the use of a basic catalyst such as dimethylbenzyl ammonium hydroxide.

The imines modified by the process of the invention have many possible uses and represent valuable intermediates for many organic syntheses.

By hydrolysis the modified imines can be split into interesting ketones or aldehydes, which can only be reached with difficulties by other routes.

On catalytic hydrogenation the imines of the invention yield many secondary amines, which can be used in different fields.

By addition of β-hydroxy-and polyhydroxy-compounds, polyol compounds are obtained, which represent important components for the polyisocyanate-addition process. By processes known from the literature, dialkyl phosphites can be added to imines modified by the process of the invention, and in this way o-aminophosphonic acid derivatives can be obtained which are valuable flame-protection agents in polyurethane or polyisocyanate foam materials.

A multitude of possibilities exists for use of mono- and polyimines of the invention in the field of isocyanate-addition processes, since they can react as masked amines as chain-extending cross-linking agents with polyisocyanates or masked polyisocyanates. The reaction can also proceed via the enamine form, such that very complex reaction lead finally to chain-lengthening or chain-branching.

In these reactions the use of modified imines is advantageous as compared with that of normal imines. Thus normal imines frequently exhibit an amine-like smell, which does not entirely vanish after reaction with isocyanate. This disadvantage is not exhibited by the imines of the invention. These imines also have the advantage that their reactivity and physical properties can be influenced within wide limits by suitable Michael-acceptors and suitable degrees of addition. The modified imines show good storage stability and are compatible with most solvents.

The degree of purity is sufficiently high for the products to be used for many purposes without special purification steps.

With low degrees of addition the isomer distribution is statistical unless special factors, such as steric hindrance are present. Most of the modified ketimines cannot be distilled without decomposition. Further modifications occur when the modified ketimines are heated for a long time at the temperatures given in the instructions.

The following Application Example shows the utility of the new compounds:

Application Example

To 250 g of prepolymer with chain-terminating carbamic acid-(4-nonyl-pheny-ester) groups (equivalent weight 1,630), which was obtained by the reaction of 1,000 g of a trifunctional polypropylene glycol (OH-number 56) with 150 g toluene-di-isocyanate and final addition of 190 g 4-nonylphenol by a known process, were added 34 g of the ketimine prepared according to Example 4 from 1 mole hexamethylene-diamine-(1,6),2mole cyclohexanone, and 2 mole acrylic acid methyl ester. The temperature was kept at 100° C for six hours. An elastic, cross-linked moulding mass was obtained. The other compounds obtainable according to the process can be used in a similar way and find application in the preparation of elastic moulding masses.

The following Examples illustrate the invention but are not to be understood as limiting the same.

Example 1

86 g acrylic acid methyl ester are slowly added dropwise with vigorous stirring to 187 g of the liquid ketimine obtained from benzylamine and cyclohexanone at a temperature between 30° and 40° C. The addition proceeds exothermically. When all the ester has been added stirring is continued for a further three hours at 40° C. Traces of volatile products can be driven off by heating briefly to 50° C in a high vacuum. The product is yellowish in colour and consists principally of the mono-addition product of the formula:

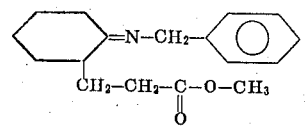

The viscosity of the ketimine starting compound is 7 cP and during the reaction rises to 34 cP at 20° C.

Example 2

187 g of the ketimine obtained from benzylamine and cyclohexanone are reacted with 172 g of acrylic acid methyl ester according to the method described in Example 1. The light yellow crude product consists primarily of the bis-addition product of the formula:

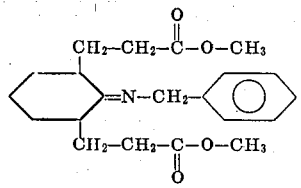

and has a viscosity of 93 cP at 20° C.

Example 3

187 g of the liquid ketimine obtained from benzylamine and cyclohexanone are reacted by the method described in Example 1 and under the same conditions with 258 g of acrylic acid methyl ester. As a sequel to this reaction, excess acrylic acid methyl ester can be removed in a high vacuum. The thus obtained modified ketimine has a viscosity of 95 cP at 20° C and is light yellow.

Example 4

276 g of the liquid bis-ketimine obtained from cyclohexanone and hexamethylene diamine are reacted at 40°–50° C with 172 g acrylic acid methyl ester using the method described in Example 1. There is thus obtained a light yellow product with a viscosity of about 73 cP at 20° C.

Example 5

252 g of the liquid bis-ketimine obtained from methylisobutyl ketone and hexamethylene diamine are reacted according to the method described in Example 1 with 172 g acrylic acid methyl ester. The reaction temperature should be held between 40° and 50° C, and to complete the reaction stirring is continued for 12 hours at this temperature. The product is nearly colourless and has a viscosity of 112 cP at 20° C.

Example 6

According to the method described in Example 1, 172 g acrylic acid methyl ester were added to 296 g of the ketimine obtained from 1,3-xylylene diamine and cyclohexanone at a maximum temperature of 55° C. Stirring was continued for three hours further at this temperature. The addition product is a yellow liquid with a viscosity of 924 cP at 20° C.

Example 7

172 g acrylic acid methyl ester are added to 330 g of the bis-ketimine obtained from cyclohexanone and isophorone diamine according to the process described in Example 1. The reaction temperature is held at 50° – 55° C by intermittent cooling. This temperature maintained for a further two hours. The product is nearly colourless and has a viscosity of 328 cP at 20° C.

Example 8

187 g of the monoketimine obtained from cyclohexanone and benzylamine are reacted with 128 g of acrylic acid butyl ester according to the process described in Example 1. The exothermic reaction is maintained at 40°–50° C by cooling. Finally the temperature is maintained at 45° C for four hours. The weakly yellowish crude product has a viscosity of 26 cP at 20° C.

Example 9

187 g of the monoketimine obtained from cyclohexanone and benzylamine are reacted with 256 g of acrylic acid butyl ester according to the method described in Example 1 and under the conditions described in Example 8. The yellowish product has a viscosity of 47 cP at 20° C.

Example 10

187 g of the monoketimine obtained from cyclohexanone and benzylamine are reacted with 384 g acrylic acid butyl ester according to the method described in Example 1, the conditions being maintained as specified in Example 8. Excess butyl ester is removed by thin-layer distillation. The addition product is yellowish (viscosity at 20° C = 50 cP).

Example 11

276 g of the bis-ketimine obtained from cyclohexanone and hexamethylene diamine are reacted with 256 g of acrylic acid butyl ester at 60° – 65° C according to the method described in Example 1. Stirring is continued for a further 5 hours at 70° C. The yellowish product exhibits a viscosity of 146 cP. at 20° C.

Example 12

252 g of the bis-ketimine obtained from hexamethylene diamine and methyl isobutyl ketone are reacted according to the process described in Example 1 at 60°–80° C with 256 g acrylic acid butyl ester. The reaction is weakly exothermic. The addition product is pale yellow. (Viscosity at 20° C= 103 cP.)

Example 13

296 g of the bis-ketimine obtained from cyclohexanone and 1,3-xylylene-diamine are reacted with 256 g acrylic acid butyl ester according to the method described in Example 1. The reaction temperature is 50°–55° C. Finally, this temperature is maintained for a further two hours. The product is a yellowish liquid. (Viscosity at 20° C = 231 cP.)

Example 14

330 g of the bis-ketimine obtained from isophorone diamine and cyclohexanone are reacted with 256 g acrylic acid butyl ester according to Example 1, at a temperature between 50° and 60° C. The post-reaction time amounts to 6 hours at 60° C. The modified ketimine is a yellowish viscous liquid. (616 cP. at 20° C.)

Example 15

267 g of the bisketimine obtained from diethylene triamine and cyclohexanone are reacted according to the method described in Example 1 with 384 g acrylic acid butyl ester. The temperature is maintained at 60° C. by cooling and stirring is continued for a further four hours. The modified ketimine has a viscosity of 413 cP. and is pale yellow in colour.

Example 16

187 g of the ketimine obtained from benzylamine and cyclohexanone are reacted by the method described in Example 1 with 144 g maleic acid dimethyl ester. The exothermic reaction is maintained by cooling at 60° C. After-stirring is continued for a further two hours at this temperature. The yellow end-product is very viscous.

Example 17

187 g of the ketimine obtained from benzylamine and cyclohexanone are reacted with 288 g maleic acid dimethyl ester at 60°–70° C by the method described in Example 1. This temperture is finally maintained for a further six hours, and then raised to 80° C for a further three hours in a high vacuum. A very viscous ketimine is thus obtained.

Example 18

296 g of the bis-ketimine obtained from 1.3-xylylenediamine and cyclohexanone are reacted with 288 g maleic acid methyl ester by the method described in Example 1 at about 40° C. Finally stirring is continued for a further 2 hours at this temperature. A yellow glutinous liquid is obtained.

Example 19

276 g of the bis-ketimine obtained from hexamethylene diamine and cyclohexanone are reacted as described in Example 1 with 288 g maleic acid methyl ester. The exothermic reaction is maintained at 40°–45° C by cooling. Stirring is continued at this temperature for a further two hours. The modified bis-ketimine is a viscous yellow liquid. (Viscosity at 20°C = 13,100 cP).

Example 20

252 g of bis-ketimine obtained from hexamethylene diamine and methyl isobutyl ketone are reacted with 288 g of maleic acid dimethyl ester by the method described in Example 1. The reaction temperature is maintained by cooling at 40°–45° C, and stirring is continued for a further two hours. The modified ketimine has a viscosity of 961 cP at 20° C.

Example 21

180 g of the bis-ketimine obtained from 4,4'-diaminodiphenylmethane and cyclohexanone are dissolved in 205 ml benzene. 128 g acrylic acid butyl ester are added dropwise and after stirring continued for 24 hours at 60° C. This solution of the modified bis-ketimine had a viscosity of 3 cP at 20° C.

Example 22

187 g of the ketimine obtained from benzylamine and cyclohexanone and 71 g acrylamide are warmed for 8 hours at 100° C. After 2 days at room temperature the liquid is sucked off from the insoluble material. The viscosity of the acrylamide-modified bis-ketimine amounts to 165 cP at 20° C.

Example 23

138 g of the bis-ketimine obtained from hexamethylene diamine and cyclohexanone are mixed slowly at 60° C with 144 g methacrylic acid β-hydroxypropyl ester and after-stirred for 20 hours at this temperature. The modified ketimine is a highly viscous oil at room temperature.

Example 24

138 g of the bis-ketimine obtained from 1,6-hexamethylene diamine and cyclo-hexanone in 150 ml benzene are mixed at 40°–50° C with 288 g of the maleic acid diester of 2,2-dimethylpropandiol-(1,3). The mixture is stirred for a further 12 hours at 50°–60° C.

The approximately 75% solution of the modified ketimine has a viscosity of 116 cP at 20° C.

Example 25

148 g of the bis-ketimine obtained from 1,3-xylylene diamine and cyclohexanone are warmed for 28 hours at 60° C with 100 g methacrylic acid methyl ester. Finally the volatile components are removed by heating in a vacuum at 60° C. The modified bis-ketimine has a viscosity of 24 770 cP at 20° C.

Example 26

256 g acrylic acid butyl ester are added dropwise to 148 g of the bis-ketimine obtained from 1,3-xylylene diamine and cyclo-hexanone. The mixture is stirred for a further 20 hours at this temperature. Small quantities of volatile components are removed by warming to 60° C in a high vacuum. The light yellow product has a viscosity of 636 cP at 20° C.

What we claim is:

1. A mixture of alpha-substituted imines comprising the reaction products of
   a. an electrophilic olefin having the formula

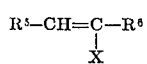

wherein $R^5$ is hydrogen, alkyl; —COOH or —COO-alkyl;
   $R^6$ is hydrogen or alkyl; and
   $X$ is hydrogen, —COOH, or —COO-alkyl, with the proviso that at least one of $R^5$ or $X$ is —COOH or —COO-alkyl; and
   b. a ketimine consisting of the reaction product of
   1. a cycloaliphatic ketone having a total of five to 12 carbon atoms and also having five to 12 carbon atoms in the ring; and
   2. an alkyl, aralkyl or aryl primary mono- and polyamines, said reaction being carried out at a temperature of between 10° and 150° C.

2. Alpha-substituted imines according to claim 1 wherein said electrophilic olefin is selected from the group of acrylic acid, acrylic acid methyl ester, acrylic acid ethyl ester, acrylic acid propyl ester, acrylic acid butyl ester, methacrylic acid, methacrylic acid methyl ester, methacrylic acid ethyl ester, methacrylic acid propyl ester, methacrylic acid butyl ester, maleic acid, fumaric acid, and the half and diesters of maleic and fumaric acids derived from methanol, ethanol, propanol, isopropanol, butanol, isobutanol, pentanol, ethylene glycol, diethylene glycol, triethylene glycol, 2,2-dimethylpropanediol-(1,3), glycerine and trimethylol propane.

3. Alpha-substituted imines according to claim 1 wherein said cycloaliphatic ketone is selected from the group of cyclopentanone, cyclohexanone, 1-methyl-cyclohexanone-(2), 1-cyclohexyl cyclohexanone-(2), cyclohexadione-(1,4), acetyl cyclohexanone, and cyclododecanone.

4. Alpha-substituted imines according to claim 1 wherein said amine is a monoamine selected from the group of methylamine, ethylamine, propylamine, isopropylamine, butylamine, isobutylamine, t-butylamine, amylamine, allylamine, isoamylamine, dodecylamine, tetradecylamine, benzylamine, aniline, and o-, m- and p-toluidine.

5. Alpha-substituted imines according to claim 1 wherein said amine is a polyamine selected from the group of ethylene diamine, propylene diamine, 1,4-diaminobutane, hexamethylene diamine, trimethyl hexamethylene diamine, m- and p-xylylenediamine, isophorone diamine, 2,4-diamino-toluene, 2,6-diaminotoluene, 4-amino-2-acetylamino toluene, dimethyl-(4-aminobenzyl)-amine, 1,3-bis-aminomethyl-4,6-di-methyl benzene, 2,4-diamino-3,5-diethyl toluene, 2,4-diamino-1,3,5-triisopropylbenzene, and 4,4'-diaminodiphenyl methane.

6. Alpha-substituted imines according to claim 1 consisting principally of a compound having the formula:

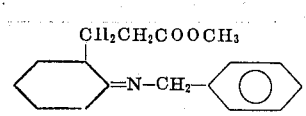

7. Alpha-substituted imine according to claim 1 consisting primarily of a compound having the formula

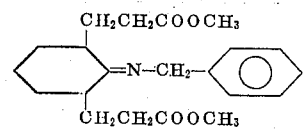

8. Alpha-substituted imines according to claim 1 comprising the reaction product of
   a. an electrophilic olefin selected from the group of acrylic acid methyl ester, acrylic acid butyl ester, maleic acid methyl ester, and maleic dimethyl ester; and
   b. a ketimine consisting of the reaction product of cyclohexanone with an amine selected from the group of benzylamine, hexamethylenediamine, 1,3-xylylenediamine, and 4,4'-diaminodiphenylmethane.

9. Process for the preparation of alpha-substituted imines which comprises reacting
   a. an electrophilic olefin having the formula

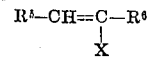

wherein $R^5$ is hydrogen, alkyl, —COOH or —COO-alkyl; $R^6$ is hydrogen or alkyl; and $X$ is hydrogen, —COOH, or —COO-alkyl; and
   b. a ketimine consisting of the reaction product of
   1. a cycloaliphatic ketone having a total of five to 12 carbon atoms with five to seven carbon atoms in the ring and
   2. an alkyl, araalkyl or aryl primary mono- and polyamines,
   at a temperature between 10° and 150° C.

10. Process of claim 9 wherein the electrophilic olefin is added dropwise to the ketimine.

11. Process of claim 9 wherein the reaction is carried out under pressure.

12. Process of claim 9 wherein the reaction is carried out in an inert solvent.

13. Process of claim 9 wherein the reaction is carried out at a temperature of from 20° to 80° C.

14. Process of claim 9 wherein the reaction is carried out in the presence of a basic catalyst.

* * * * *